(12) United States Patent
Tater et al.

(10) Patent No.: US 12,346,832 B2
(45) Date of Patent: Jul. 1, 2025

(54) ADAPTIVE ANSWER CONFIDENCE SCORING BY AGENTS IN MULTI-AGENT SYSTEM

(71) Applicant: International Business Machines Corporation, Armonk, NY (US)

(72) Inventors: Tarun Tater, Nagaur (IN); Jaydeep Sen, Bangalore (IN); Vatche Isahagian, Belmont, MA (US); Yara Rizk, Cambridge, MA (US); Vinod Muthusamy, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 923 days.

(21) Appl. No.: 17/508,146

(22) Filed: Oct. 22, 2021

(65) Prior Publication Data

US 2023/0131495 A1      Apr. 27, 2023

(51) Int. Cl.
    *G06N 5/043*       (2023.01)
    *G06F 11/34*       (2006.01)
    (Continued)

(52) U.S. Cl.
    CPC ......... *G06N 5/043* (2013.01); *G06F 11/3409* (2013.01); *G06F 40/211* (2020.01); *G06N 5/045* (2013.01)

(58) Field of Classification Search
    CPC ........ G06N 5/043; G06N 5/045; G06N 3/044; G06N 3/045; G06N 3/08; G06N 7/01;
    (Continued)

(56) References Cited

U.S. PATENT DOCUMENTS 9,990,591 B2    6/2018    Gelfenbeyn et al.
10,498,898 B2   12/2019   Mazza et al.
(Continued)

FOREIGN PATENT DOCUMENTS

CN        114003709 A      2/2022

OTHER PUBLICATIONS

"The Reasoning and Learning Lab Chatbot: a solution to the Conversational Intelligence Challenge" Nicolas Angelard-Gontier (Year : 2018).*

(Continued)

*Primary Examiner* — Pei Yong Weng
(74) *Attorney, Agent, or Firm* — Scully, Scott, Murphy & Presser, P.C.; Caleb Wilkes

(57) ABSTRACT

A query can be received from a user. The query can be sent to a plurality of automated agents to process the query. Results and associated confidence scores can be received from the plurality of automated agents. At least some of the results and associated confidence scores can be probed, based at least on a reason given for a result having the highest associated confidence score among the received results and associated confidence scores, to select an automated agent from the plurality of automated agents for answering the query. Information can be stored, where the information can include at least the results and associated confidence scores and a selected automated agent for answering the query, where at least one of the plurality of automated agents learns from the stored information to update its confidence score in answering the query.

20 Claims, 14 Drawing Sheets

(51) Int. Cl.
*G06F 40/211* (2020.01)
*G06N 5/045* (2023.01)

(58) Field of Classification Search
CPC .... G06F 11/3409; G06F 40/211; G06F 40/30; G06F 40/35
See application file for complete search history.

(56) References Cited

U.S. PATENT DOCUMENTS

| | | |
|---|---|---|
| 10,671,448 B2 | 6/2020 | Wood et al. |
| 10,841,250 B2 | 11/2020 | Borsutsky et al. |
| 2014/0270145 A1 | 9/2014 | Erhart et al. |
| 2018/0025726 A1 | 1/2018 | Gatti de Bayser et al. |
| 2019/0158433 A1 | 5/2019 | Yun et al. |
| 2020/0027553 A1 | 1/2020 | Vaughn et al. |
| 2020/0344187 A1 | 10/2020 | D'Agostino et al. |
| 2021/0119945 A1* | 4/2021 | Sohum ................... G06N 5/01 |

OTHER PUBLICATIONS

NIST, "NIST Cloud Computing Program", http://csrc.nist.gov/groups/SNS/cloud-computing/index.html, Created Dec. 1, 2016, Updated Oct. 6, 2017, 9 pages.
International Search Report dated Dec. 27, 2022 issued in PCT/CN2022/125881, 9 pages.

* cited by examiner

ADAPTIVE ANSWER CONFIDENCE SCORING BY AGENTS IN MULTI-AGENT SYSTEM

BACKGROUND

The present application relates generally to computers and computer applications, and more particularly to automated agents such as bots in multi-agent environment and orchestrating the multi-agent environment in conducting a natural language conversation with a user.

An automated agent such as a chatbot is a conversational agent or program, which can perform a task of carrying on a conversation with a user such as a human user, for example, answering the user's questions in a chat session via speech and/or text. Such an automated agent may be implemented using one or more artificial intelligence techniques such as machine learning, e.g., neural networks and deep learning. When there is a plurality of automated agents, different automated agents may provide responses to the user's queries in different ways.

BRIEF SUMMARY

The summary of the disclosure is given to aid understanding of a computer system and method of managing multiple agents in a conversational (e.g., chatbot) or like system, and not with an intent to limit the disclosure or the invention. It should be understood that various aspects and features of the disclosure may advantageously be used separately in some instances, or in combination with other aspects and features of the disclosure in other instances. Accordingly, variations and modifications may be made to the computer system and/or their method of operation to achieve different effects.

A method, in an aspect, can include receiving a query from a user. The method can also include sending the query to a plurality of automated agents to process the query. The method can further include receiving results and associated confidence scores from the plurality of automated agents. The method can also include probing at least some of the results and associated confidence scores, based at least on a reason given for a result having the highest associated confidence score among the received results and associated confidence scores, to select an automated agent from the plurality of automated agents for answering the query. The method can also include storing information including at least the results and associated confidence scores and a selected automated agent for answering the query, where at least one of the plurality of automated agents is caused to learn from the stored information to update a confidence score of said at least one of the plurality of automated agents in answering the query.

A method, in another aspect, can include receiving a query from a user. The method can also include sending the query to a plurality of automated agents to process the query. The method can further include receiving results and associated confidence scores from the plurality of automated agents. The method can also include storing information, where the information includes at least the results and associated confidence scores from the plurality of automated agents. At least one of the plurality of automated agents can be caused to learn from the stored information to update a confidence score of the at least one of the plurality of automated agents in answering the query, by normalizing the confidence score over the associated confidence scores returned by the plurality of the automated agents.

A method, in another aspect, can include receiving a query from a user. The method can also include sending the query to a plurality of automated agents to process the query. The method can further include receiving results and associated confidence scores from the plurality of automated agents. The method can also include storing information, where the information includes at least the results and associated confidence scores from the plurality of automated agents. At least one of the plurality of automated agents can be caused to learn from the stored information to update a confidence score of the at least one of the plurality of automated agents in answering the query, learning n-gram bag of words, which if contained in future one or more queries, the at least one of the plurality of automated agents should not handle.

A method, in another aspect, can include receiving a query from a user. The method can also include sending the query to a plurality of automated agents to process the query. The method can further include receiving results and associated confidence scores from the plurality of automated agents. The method can also include storing information, where the information includes at least the results and associated confidence scores from the plurality of automated agents. At least one of the plurality of automated agents can be caused to learn from the stored information to update a confidence score of the at least one of the plurality of automated agents in answering the query, learning a context free grammar representing phrases, which if contained in future one or more queries, the at least one of the plurality of automated agents should not handle.

A method, in another aspect, can include receiving a query from a user. The method can also include sending the query to a plurality of automated agents to process the query. The method can further include receiving results and associated confidence scores from the plurality of automated agents. The method can also include storing information, where the information includes at least the results and associated confidence scores from the plurality of automated agents. At least one of the plurality of automated agents can be caused to learn from the stored information to update a confidence score of the at least one of the plurality of automated agents in answering the query, training a classifier to classify words, which if contained in future one or more queries, the at least one of the plurality of automated agents should not handle.

A method, in another aspect, can include receiving a query from a user. The method can also include sending the query to a plurality of automated agents to process the query. The method can further include receiving results and associated confidence scores from the plurality of automated agents. The method can also include storing information, where the information includes at least the results and associated confidence scores from the plurality of automated agents. At least one of the plurality of automated agents can be caused to learn from the stored information to update a confidence score of the at least one of the plurality of automated agents in answering the query, computing a reward-based dynamic scoring based on parameters including at least the associated confidence scores of the plurality of automated agents, attributes of the query and whether said at least one of the plurality of automated agents is selected or not selected for answering the query. The reward-based dynamic scoring can include hyperparameters associated with the associated confidences scores, the attributes of the query, and a weight associated with whether the at least one of the plurality of automated agents is selected or not selected for answering the query. The hyperparameters can be tuned over time based on training examples.

A system, which can include at least a processor and a memory device coupled with the processor, where the processor can be configured to perform one or more methods described herein, can also be provided. A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

An utterance based, e.g., natural language (NL) utterance based multiple-agent (multi-agent) system or framework can be provided where each agent is capable of dynamically changing its output confidence and adapting to its multi-agent environment. In one or more embodiments, techniques and/or algorithms can be provided where an agent can use feedback from central orchestrator and/or actively learn from historical interaction memory to produce a dynamic output score. In one or more embodiments, systems, methods and/or techniques allow an agent to dynamically compute adaptive confidence score through active learning and/or intelligently interacting with an orchestrator system or platform to learn about other agents in the environment. An example of an orchestrator can include, but is not limited to, IBM Watson® Orchestrate®, from International Business Machines Corporation, Armonk, New York. In one or more embodiments, the agents calibrate their output confidence based on the direct or indirect feedback from the orchestrator and can adapt to the multi-agent environment.

A multi-agent system or framework can include a plurality of, or multiple, agents, which can be natural language utterance based. For instance, the agents can be automated processors or computer-implemented programs capable of conducting or carrying on a conversation in natural language (e.g., written or spoken English or another language) with another user, e.g., a human user or another automated agent. In an embodiment, each agent is capable of dynamically changing its output confidence and adapting to its multi-agent environment. In an embodiment, an agent may calibrate its confidence score based on feedback from an orchestrator (e.g., central orchestrator) via focused probing which helps multi-agent environment to become more accurate. The agents can produce a dynamic output score by actively learning from a historical interaction memory. For example, in an embodiment, actively learning from a historical interaction memory can include analyzing utterances for frequent n-grams and a context-free grammar (CFG) representing non-natural language query (NLQ) head phrases. In an embodiment, the system and/or method can modify the code blocks and make new builds of application image for deployment. In one or more aspects, the system and/or method can provide for dynamically changing agent's confidence and adapting to the multi-agent environment, improving the multi-agent environment using feedback from an orchestrator via focused probing, and using an interaction memory to actively learn to dynamically update confidence of each agent.

Figure 1:
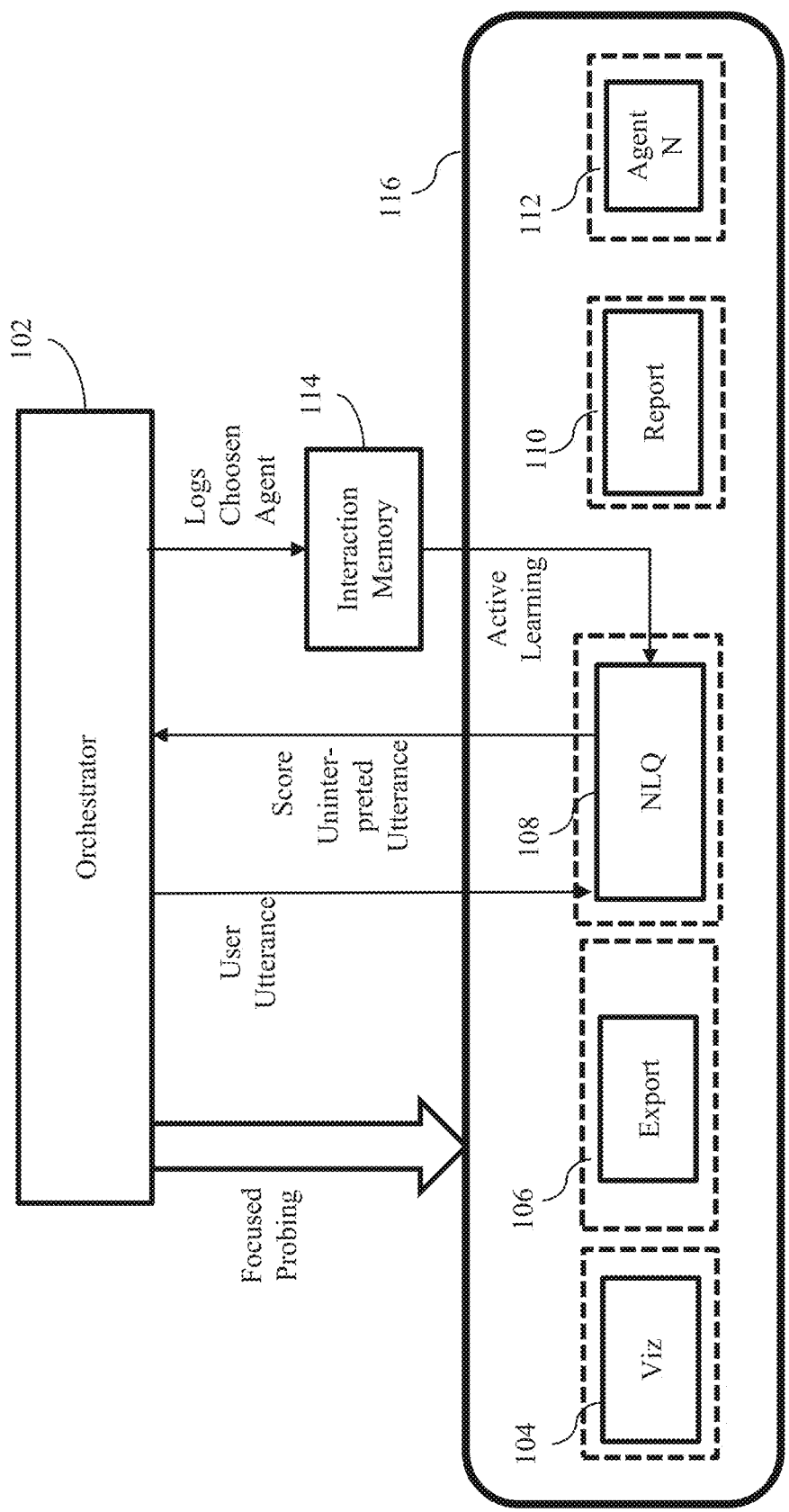
FIG. 1 is an architectural diagram illustrating a multiple-agent (multi-agent) system in an embodiment.

FIG. 1 is an architectural diagram illustrating a multiple-agent (multi-agent) system in an embodiment. The components shown include computer-implemented components, for instance, implemented and/or run on one or more hardware processors, or coupled with one or more hardware processors. One or more hardware processors, for example, may include components such as programmable logic devices, microcontrollers, memory devices, and/or other hardware components, which may be configured to perform respective tasks described in the present disclosure. Coupled memory devices may be configured to selectively store instructions executable by one or more hardware processors.

A processor may be a central processing unit (CPU), a graphics processing unit (GPU), a field programmable gate array (FPGA), an application specific integrated circuit (ASIC), another suitable processing component or device, or one or more combinations thereof. The processor may be coupled with a memory device. The memory device may include random access memory (RAM), read-only memory (ROM) or another memory device, and may store data and/or processor instructions for implementing various functionalities associated with the methods and/or systems described herein. The processor may execute computer instructions stored in the memory or received from another computer device or medium.

An orchestrator 102 can be a computer-implemented module or component, which can interact with a user as well as agents or services. An orchestrator 102 receives an utterance, e.g., directly or indirectly, from a user and determines which one of the agents should respond to the utterance or which one of the agents' responses should be used to respond to the user. An utterance can be in natural language, e.g., spoken or written natural language. For instance, the orchestrator 102 can be a part or component of a platform or computer system that provides an automated service to a user via having a conversation with the user, for example, facilitate natural language conversations with a user in answering and/or providing information to one or more user queries. For instance, the orchestrator 102 can be chatbot or voicebot functionalities for conversing with a user. An utterance, for example, can include a query or a question from a user which is to be answered or addressed. For example, the orchestrator may determine which service, code or module would be able to provide the most accurate or appropriate answer to the user's query.

The orchestrator 102, for example, broadcasts or sends the user's utterance or query to a plurality of agents 104, 106, 108, 110, 112. Examples of different agents can include, but are not limited to, an agent capable of providing services related to visualization 104 (e.g., referred to as "visualization agent"), an agent capable of providing services related to data export 106 (e.g., referred to as "data export agent"), an agent or service capable of understanding natural language queries 108 (referred to as "natural language query agent" or NLQ agent), an agent capable of providing services related to reports or report generations (e.g., referred to as "report agent") and other 112. Agents 116 can be computer-implemented modules or services, each having a specialized skill for providing its service. Such computer-implemented modules can include or employ machine learning to be able to provide their respective services. For example, an agent can be trained to learn its skill with its own training data and for its requirements without any knowledge of what the other agents are or how others are trained. An agent can be a bot, e.g., a computer program or software or the like performing an automated task. Each of the agents 116 can be run on or deployed on one or more computer systems or platforms.

In an embodiment, the list of available services (also referred to as skills or agents) to the orchestrator 102 can be dynamic. In an embodiment, the user may choose or select a subset of agents (skills or services) from the orchestrator's skills catalogue. In an embodiment, the orchestrator 102 can allow for dynamic addition of external customized skills by users. In an embodiment, the orchestrator 102 need not have the knowledge about which agent is trained using which data points and the scale of individual scoring of those agents. The orchestrator 102 can allow for an agent (skill or service) to adapt its scoring based on current set of deployed agents (skills or services), which can be dynamic itself.

Each of the agents 116 may process the query and return its response with a confidence score. The confidence score represents how confident the agent is in its response, e.g., that the response correctly responds to the query. The orchestrator 102 may select an agent or agent's response to use in providing an answer to the query to the user, for example, based on the confidence scores. For instance, the orchestrator 102 may choose an agent with highest confidence score. The orchestrator 102 may also log its selection, the utterances, answers provided by the agents 116 and their confidence scores, e.g., in memory or storage device, e.g., referred to also as an interaction memory 114. The agents 116 may use the data in the interaction memory 114 to further learn from each other's answers or responses.

By way of example, the NLQ agent 108 may interpret the utterance, and send a score and any uninterpreted part of the utterance. An uninterpreted part of the utterance can be a phrase or word that this agent (e.g., the NLQ agent 108) does not understand and do not know how to process. The orchestrator 102 may perform a focused probe with the uninterpreted utterance to find another agent, which may be able to handle that part of the utterance, or another agent, which may be able to handle the entire utterance. The orchestrator 102 also can log the chosen agent or service for the utterance to an interaction memory 114. The interaction memory 114 can be a memory or storage device, for example, which can be part of each of the agents (e.g., local memory of an agent) or part of the orchestrator (e.g., a central memory). The NLQ agent 108 can actively learn from what natural language patterns are not for itself and adjust the score for future similar utterances. For instance, the NLQ agent 108 can learn that portions of the utterance which it did not understand can be processed better by another agent, and therefore, the next time the NLQ agent 108 sees or recognizes such utterance, the NLQ agent 108 know that it should not be handling such utterance. For instance, the NLQ agent 108 may adjust its confidence score for answering such utterance. While the example referred to the NLQ agent 108, each of all agents 116 can use the interaction memory 114 of information from the orchestrator 102 to update or retrain itself.

For example, a user query can be "show me restaurants with 5 star ratings." The phrase "show me" can mean to plot the data or to just fetch the data from a database. In this example scenario, both the visualization agent and NLQ service or agent can perform this task. Each agent may return a response with associated confidence score. For instance, the NLQ agent may indicate that it understood all the words in the question and hence is returning a result with 100 percent confidence score. The visualization agent may indicate that it does not understand the phrase "show me" and hence return a result with 80 percent confidence score. A system and method disclosed herein can render the orchestrator to be more intelligent, for example, by allowing normalizing of the confidence scores of the agents' results.

In an embodiment, the multi-agent system can include multiple agents whose functionalities or capabilities can overlap. For instance, multiple agents can be capable of understanding natural language queries and may be capable of understating a question posed by a user. Some agents may not understand the query completely, for example, only partially understand the query. Because there can be overlaps in their functionalities, multiple agents can answer the same question, albeit somewhat differently. The orchestrator, for example, determines which response from which agent is the most suitable answer.

Figure 2:
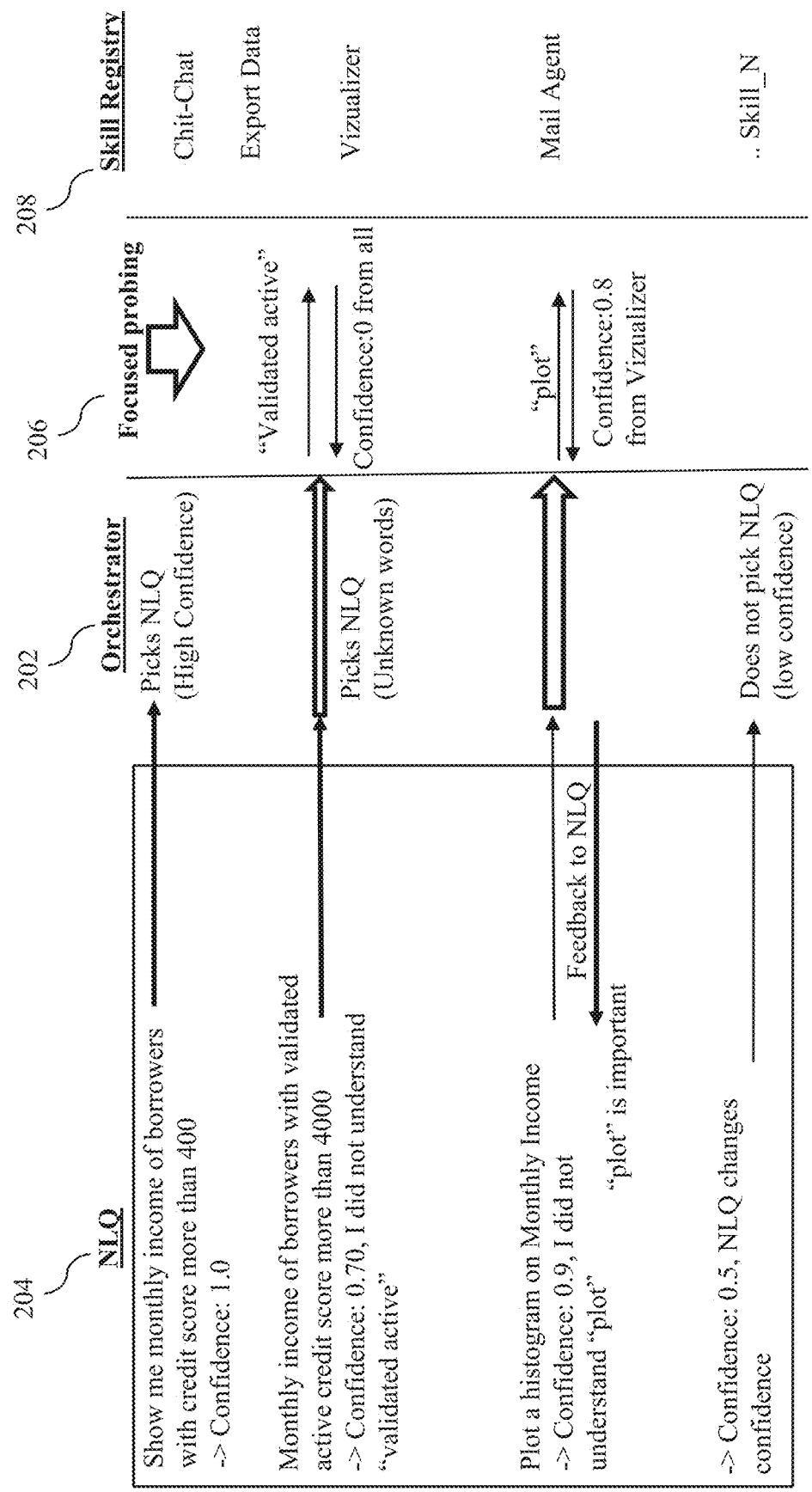
FIG. 2 is a diagram illustrating a multi-agent system using focused probing in an embodiment.

FIG. 2 is a diagram illustrating a multi-agent system using focused probing in an embodiment. The diagram shows interactions between an agent (as an example) and the orchestrator in an embodiment. An example agent shown is an NLQ agent, having skills to interpret a natural language query and provide an answer to the query, for example, by performing a search for an answer. The orchestrator 202 allows the agent 204 (e.g., NLQ) to change its confidence score based on the orchestrator's knowledge of other available agents or services 208 through focused probing 206. The process shown can be generalized to any agent or service, e.g., which implements a similar interface of producing unmatched words from the utterance.

Consider the following example scenario shown in FIG. 2. The NLQ agent 204 may receive a query, "show me monthly income of borrowers with credit score more than 400." The NLQ agent 204 determines that it can handle this question with 100 percent confidence, e.g., confidence score of 1.0, and returns the result with the confidence score to the orchestrator 202. The orchestrator 202 picks or chooses the NLQ agent 204 to provide the answer to the query because the NLQ agent 204 provided the highest confidence score out of other agents 208, e.g., in the skill registry 208.

The NLQ agent 204 receives another query "Monthly income of borrowers with validated active credit score more than 4000." The NLQ agent 204 returns a result with confidence score of 70 percent or 0.7, indicating that it did not understand the phrase "validated active." The orchestrator 202 performs a focused probing 206, for example, probes whether other agents 208, e.g., in the skill registry, understood the query better. Focused probing shows that confidence scores from other agents are zero. Hence, in this example, even if the NLQ agent 204 returned 0.7 confidence score, the orchestrator selects the NLQ agent 204 to provide the answer to the query since no other agents have any better results (e.g., their confidence scores are all 0s).

The NLQ agent 204 receives yet another query "Plot a histogram on Monthly Income." The NLQ agent 204 returns a result or response with confidence score of 90 percent or 0.9 to the orchestrator 202, indicating that it did not understand the word "plot". Another agent, for example, a visualization agent returns confidence score of 80 percent or 0.8. The orchestrator 202 performs focused probing 206 and sees that the visualizer agent returned a result with confidence score of 0.8. Further probing indicates that the word "plot" is important in this query. The orchestrator 202 can understand that "plot" is an important word or token in this query in multiple ways. For example, in an embodiment, one way can be through intent classification in speech understanding: the word "plot" can be viewed as an intent identification term hence giving more importance to it given the capabilities of each agent. As another example, in an embodiment, a different agent under the orchestrator 202 may indicate that it (the different agent) understands the word "plot", signifying the word "plot" has a specific meaning for an existing agent. The orchestrator 202 returns this feedback (e.g., another agent's response and/or confidence score such as the visualization agent's response and/or confidence score) to the NLQ agent 204. For example, the feedback can be returned by storing the information in an interaction memory and allowing the NLQ agent 204 to access the interaction memory and the feedback. In another embodiment, the feedback can be returned by communicating the information to the NLQ agent 204, which may store the feedback in its local memory. Based on the feedback, the NLQ agent 204 updates its confidence score to 50 percent or 0.5. The orchestrator 202 receives the updated confidence score from the NLQ agent 204, and picks or chooses the visualization agent's response since the confidence score of the visualization agent's response is now higher than the NLQ agent's response.

In an embodiment, active learning can be performed based on interaction memory (e.g., FIG. 1 at 114). The interaction memory can include data, for example, logged by the orchestrator (e.g., FIG. 1 at 102). If there is ambiguity between an agent, e.g., NLQ agent, and another agent, the orchestrator can use disambiguation to select the right agent. Ambiguity can occur if two or more agents return the same highest confidence score for answering a query. The orchestrator, which decides which agent's answer to use can use data in the interaction memory to disambiguate or resolve the ambiguity. For instance, the orchestrator may log all utterances to interaction memory where an agent, e.g., NLQ agent was not chosen even when it returned a high confidence score. The orchestrator can determine the types of utterances, in which the NLQ agent returned a high confidence score and yet its answer was not chosen. The next time the NLQ agent returns similarly high confidence score in processing a similar type of utterance, the orchestrator will know to select another agent's answer, despite the NLQ agent and that other agent returning the high confidence scores.

By way of example, an agent, e.g., the NLQ agent can learn a language pattern from non-NLQ utterances logged in NLQ memory. For example, the NLQ agent may store in a memory such as a local memory to the NLQ agent a list of words or phrases, which the NLQ agent is not trained to act on, and for example, which there are other agents in the multi-agent system that can process better. Non-NLQ utterances refer to those utterances, which the NLQ is not trained to recognize or does not know how to process. In an embodiment, frequent N-grams approach can be implemented to learn non-NLQ utterances. For example, the agent can employ a n-gram bag of words model to collect most frequent n-grams seen in non-NLQ utterances. The agent can collect or store n-grams such as "plot", "hello", "save as", "export to", and/or others, as most frequent n-gram in non-NLQ utterance. For instance, in the multi-agent system, there may be another agent such as a visualization agent that can better handle utterances containing the word or n-gram "plot", another agent such as a chit chat agent that can better handle utterances containing the word or n-gram "hello", another agent such as a data export agent that can handle utterances containing the n-gram "export to", and so forth. Given a new utterance, if the new utterance contains one of these n-grams, the agent can flag it as non-NLQ utterance and determine that this utterance (e.g., query) is not one that the NLQ agent should answer. For example, the NLQ agent may return a confidence score of 0 or another low confidence score.

In another embodiment, the agent may implement learning a context-free grammar (CFG) representing non-NLQ head phrases. Many non-NLQ queries may share some common language pattern to denote the command such as "Export this data as . . . ", "can you plot it as . . . ", "save this as . . . ", "how much discount I can apply . . . ", and/or others. The agent can learn a context free grammar (CFG) to accept the unique language patterns seen in non-NLQ utterances. Given a new utterance, if the CFG accepts the new utterance (e.g., the new utterance has a similar language pattern like the patterns CFG is designed on for recognizing non-NLQ utterance, e.g., the pattern is similar to what it has been seen before while constructing the CFG parser), the agent can flag it as non-NLQ utterance and determine that this utterance (e.g., query) is not one that the NLQ agent should answer. For example, the NLQ agent may return a confidence score of 0 or another low confidence score ("low" determined based on a predefined threshold).

In another embodiment, active learning on interaction memory can include learning a classifier or training a classifier. An NLQ agent, for example, can use the data logged as non-NLQ utterance (as negative examples) versus NLQ utterances from the orchestrator, which the agent handled, as positive examples in learning or training. Given a new utterance, the classifier detects if it is a non-NLQ utterance, e.g., whether the NLQ agent should handle the query or not (e.g., yes and no classification). Each of the above-described active learning embodiments can be generalizable to any skills, e.g., not limited to an NLQ agent.

In an embodiment, reward based dynamic scoring can be implemented. An orchestrator may communicate the confidence score it received from each agent for the same utterance. An agent may use results of other agents in providing its confidence score. Such scoring mechanism can include learning the hyperparameters in an online fashion. A reward-based mechanism can be based on several parameters. For instance, the following shows an example computation for determining confidence score:

$$Sq = \sum_{k=0}^{n}(\alpha_k A_k) + \sum_{i=0}^{m}(\beta_i V_i) + \gamma^* |nlq \text{ confidence} - isSelected(0/1)|$$

where $A_k$ is each individual attribute matched. q represents query, Sq representing score for this query. Each agent may maintain such a scoring mechanism, where the "nlq confidence" in the above equation would be the confidence of that agent. The attributes can include aggregations, orderby, groupby, limit, time constraints, and/or others, e.g., features which are aggregations, orderby, groupby, limit, time constraints, and/or others. For example, the attribute for aggregation would be 1 if there is an aggregation in the query, 0 otherwise. Other attributes can be quantified similarly. n represents the number of attributes (in this case number of attributes−1, since the index k starts from 0), where there are n different attributes. Vi corresponds to the confidence score other agents had for the same utterance. γ weighs the current reward in terms of the agent (e.g., NLQ agent) being selected or not. α, β, γ are tunable hyper-parameters that can be learned over time with more and more training examples. Training examples can be obtained from the continuous queries from user and their feedback as to whether the answer presented to the user is what the user expected. α, β, γ, which are learned signify how much importance should be given to each individual component. Sq can be computed based on learned α, β, γ. m represents the number of agents (in this case number of agents−1, since the index i starts from 0, where there are m different agents). The approach is generalizable to any other agents or services (skills), not limited to NLQ agent or service, e.g., where the hyperparameters of the learning model can be customized depending on the agent.

Figure 3:
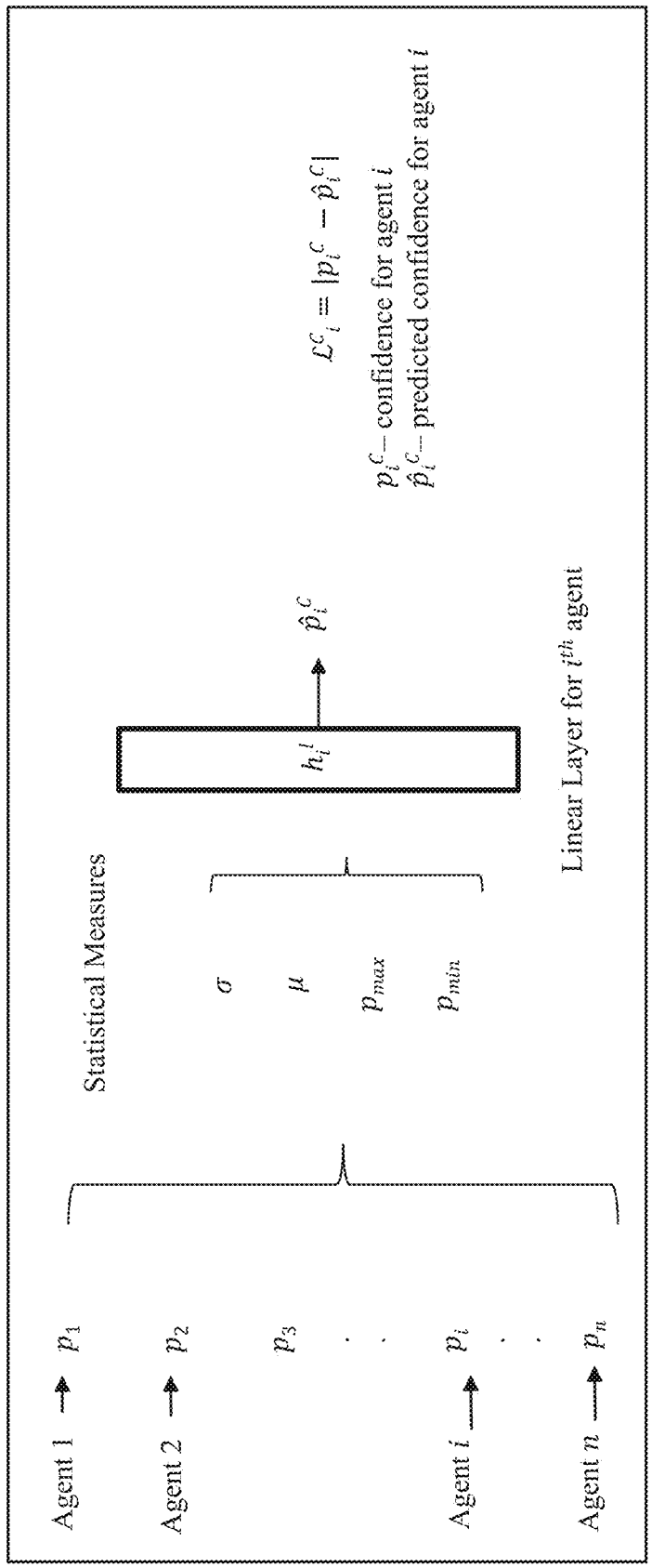
FIG. 3 is a diagram showing learning confidence standardization in an embodiment.

FIG. 3 is a diagram showing learning confidence standardization in an embodiment. In an embodiment, learning confidence standardization may normalize the confidence scores across the agents. Such standardization or normalization allows for creating a reward or loss, which helps an agent learn with respect to (w.r.t.) confidence scores of other agents. The standardization also helps to recalibrate and align the prediction confidence values of the task to demonstrate actual confidence. In an embodiment, a multi-layer perceptron (MLP) can learn to optimize the confidence given the confidence scores taking measures like maximum, minimum, mean, and standard deviation of those scores from all agents ($p_i$, where i represents an agent) given an utterance. These statistics can be transformed using a linear layer (agent specific) that predicts confidence $\hat{p}^C$ of the original prediction. $\mathcal{L}^C = |p^C - \hat{p}^C|$ computes the loss by evaluating the difference between the expected value and predicted value, where $\mathcal{L}_i^C$ is loss in confidence for i-th agent, $p^C$ is predicted confidence and $\hat{p}^C$ is expected (true) confidence. In an embodiment, the MLP can try to reduce this difference by treating this as a loss to train the model. In an aspect, no additional data annotations may be required and no need of knowing what the other agents and their functioning are. The approach can be generalizable to any skills, not limited to NLQ service, e.g., where the parameters of the MLP model can be customized depending on the agent.

A system and/or method disclosed herein can improve a scoring mechanism of individual agents, services or skills, and allow an orchestrator to be able to attend to multiple tasks accurately. A dynamic scoring for an agent, service or skill in a multiagent system space can improve an orchestrator's performance.

Figure 4A:
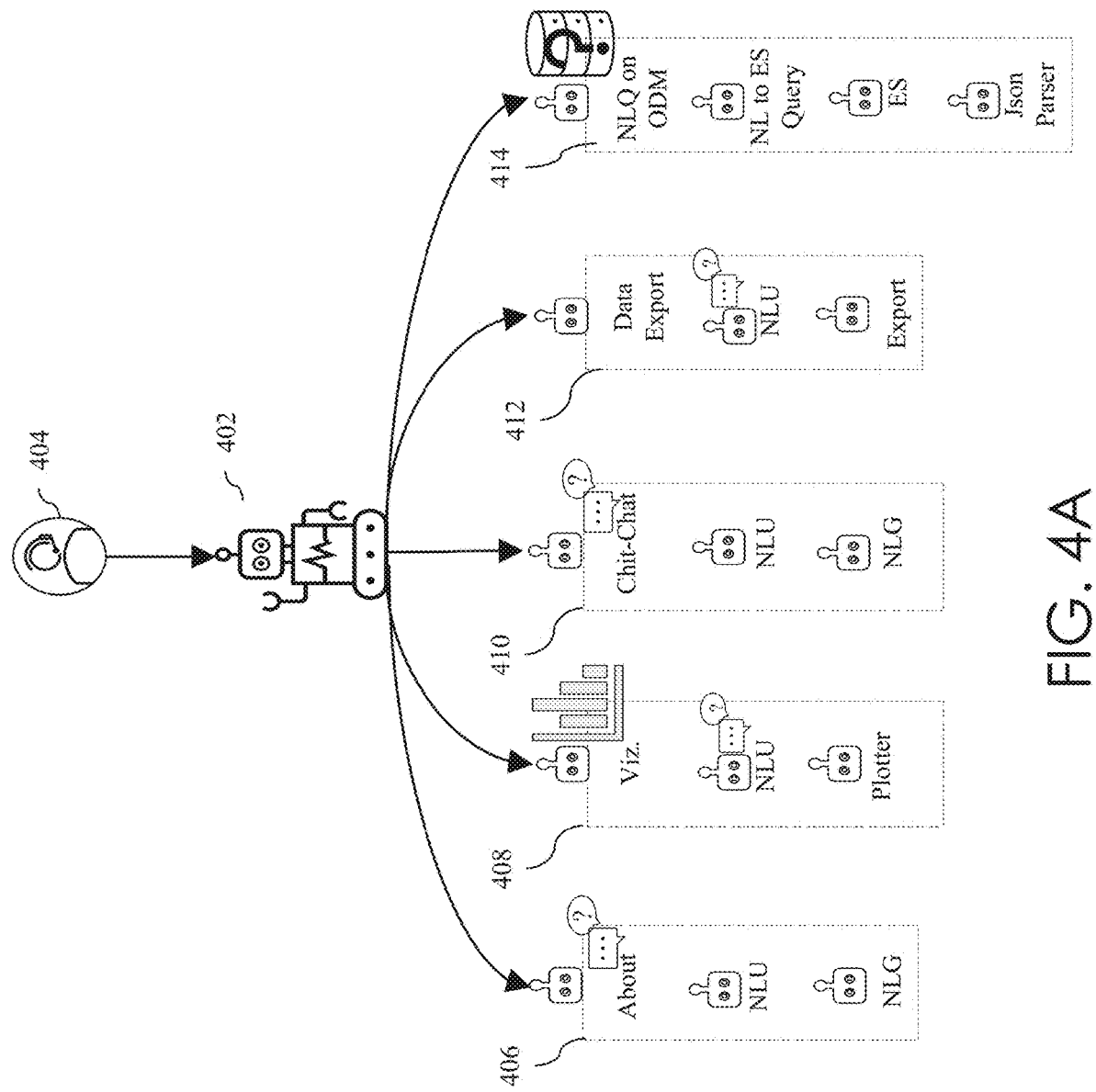
FIGS. 4A-4F illustrate a use case example of a functioning of a multi-agent system in an embodiment.

FIGS. 4A-4F illustrate a use case example of a functioning of a multi-agent system in an embodiment. Referring to FIG. 4A, an orchestrator, mediator, or like functionality 402, which can include a robot (also referred to as a bot), chatbot or voicebot or like component or application may be communicating with a user in natural language (e.g., via texting and/or voice conversation). A bot or robot, for example, is a computer application or software that performs an automated task. The component shown at 402 can act as an orchestrator or mediator, take a question from a user 404 and broadcast the question to one or more agents or services 406, 408, 410, 412, 414. The agents or services 406, 408, 410, 412, 414 can also be bots performing their tasks. For example, there can be different types of agents or services, which the orchestrator 402 can use to answer the user's question. By way of example, different services can include a service that provides information 406, a service that can handle visualizations 408, a service that can perform chit chats 410, a service that can handle data exports 412, a service that can interpret natural language 414, and/or others. One or more agents or services (e.g., 406, 408, 410, 412 and 414) may implement or use natural language processing (NLP) techniques such as natural language understanding (NLU), for instance, which can be used to interpret or understand utterances, and natural language generation (NLG), which can be used to generate natural language responses. Briefly, NLU may employ syntactic and semantic analysis of text and speech to determine the meaning of an utterance. By way of example, NLG can implement hidden Markov chains, recurrent neural networks, and/or transformers, for text or speech generation, for example, in real time, for responding to queries. By way of example, the NLQ agent service 414 can be an NLQ engine instance, for example, built with ontology database mappings (ODM). By way of example, the NLQ agent or service may implement or use one or more search engines such as but not limited to Elasticsearch (ES), and parsers such as but not limited to JavaScript Object Notation (JSON) parser to interpret and provide answers to queries.

Each agent (e.g., 406, 408, 410, 412, 414) receiving a question may return its response and confidence score associated with its response. For instance, an agent (e.g., NLQ) 414 may return a response and a 100% confidence score associated with its response. The confidence score represents how confident the agent is regarding its response being the correct answer to the question. Another agent (e.g., Viz) 408 may return its response and 80% confidence score associated with its response. The other agents may also return their responses and associated confidence scores.

Figure 4B:
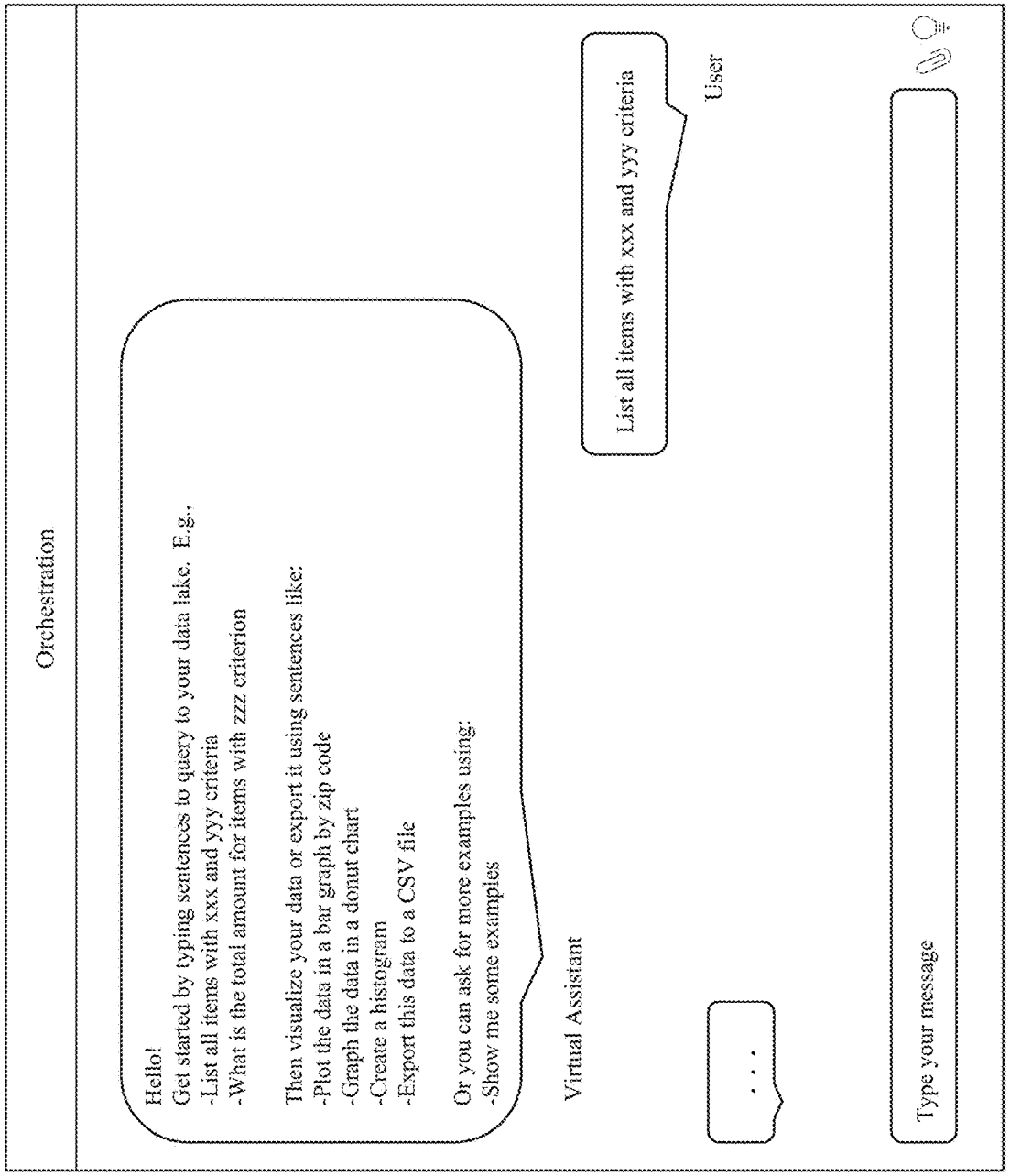

Referring to FIG. 4B, an orchestrator 402 may present on a user interface a prompt to a user, for example, which can initiate a chat session with a user. For example, a message in a speech bubble at 416 includes example instructions to a user to start a chat. A message in a speech bubble at 418 shows user's input or query. The orchestrator 402 may receive the user's query 418 and may invoke a plurality of agents 406, 408, 410, 412 and/or 414, to answer the query.

Figure 4C:
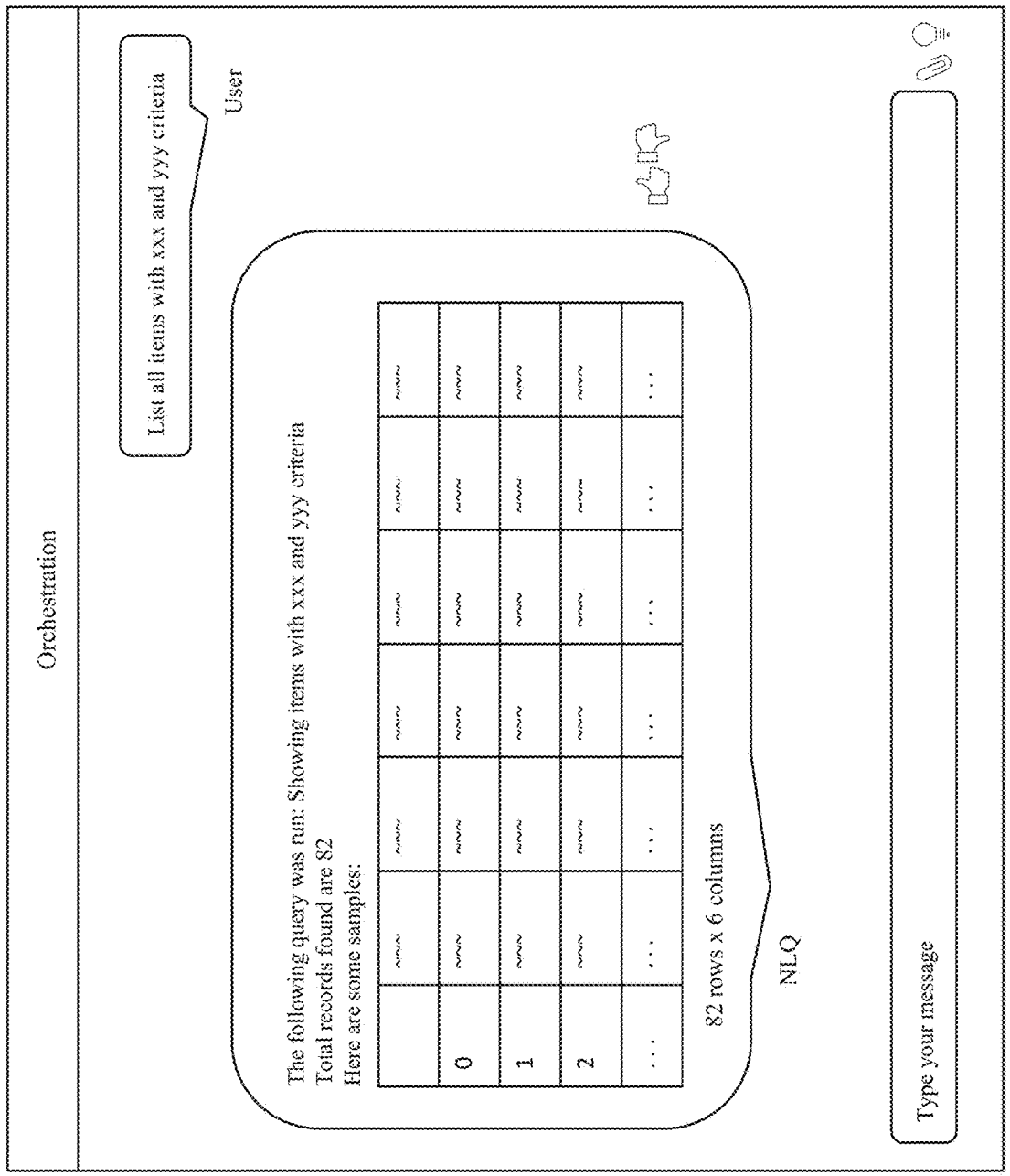

Continuing to FIG. 4C, a response returned by the NLQ agent 414 is shown at 420. For instance, NLQ agent 414 may have produced the answer to the query with the highest confidence score, and the orchestrator 402 may have chosen the NLQ agent 414 to provide the answer. The user interface can also provide an input icon or field or the like, where a user may provide a feedback regarding the result (e.g., thumbs-up/thumbs-down, or another input field). The orchestrator 402 may also log information associated with responses of the plurality of agents, and any feedback from the user, in an interaction memory, from which each of the plurality of agents may learn and update its algorithm in providing an answer.

Figure 4D:
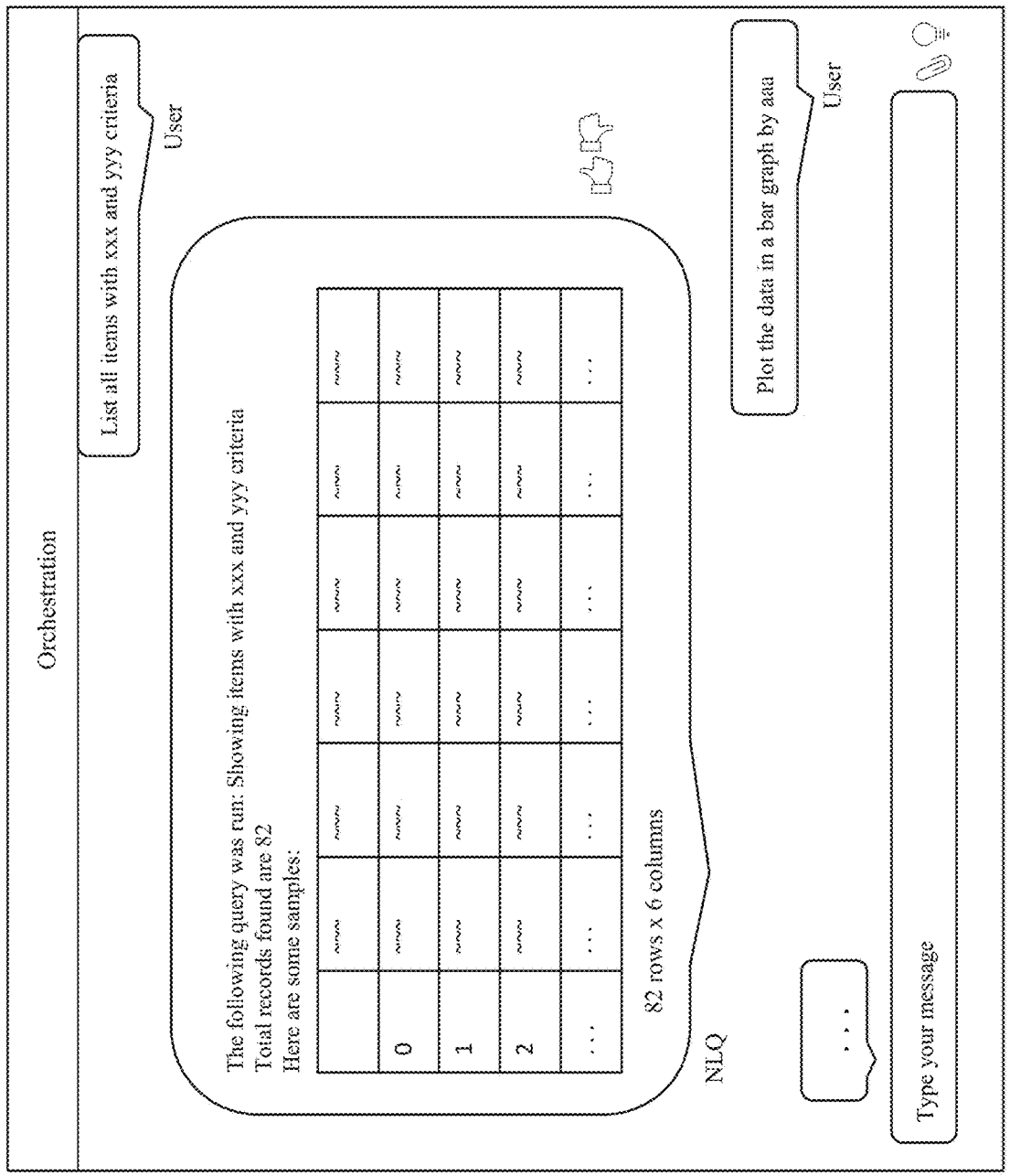

Continuing to FIG. 4D, a user may further input query 422, e.g., asking to plot the data shown in the previous response (e.g., shown at 420). The orchestrator 402 sends this query to the plurality of agents 406, 408, 410, 412 and/or 414, to provide a response to this query.

Figure 4E:
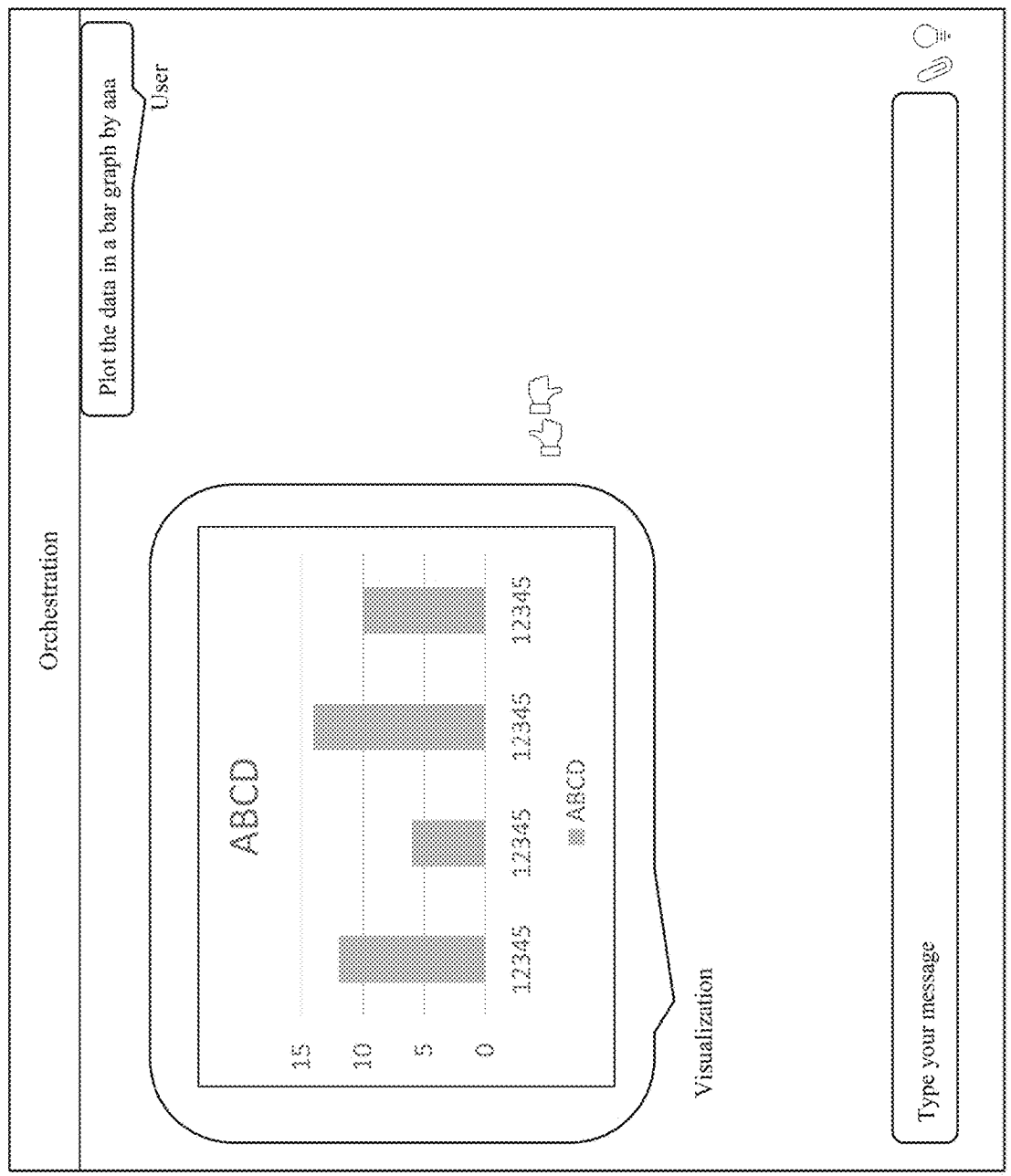

Continuing to FIG. 4E, a response returned by the visualization agent 408 is shown at 424. For example, the visualization agent 408 may have produced the answer to this query with the highest confidence score, and the orchestrator 402 may have chosen the visualization agent 408 to provide the answer. The user interface can also provide an input icon or field or the like, where a user may provide a feedback regarding the result (e.g., thumbs-up/thumbs-down, or another input field). The orchestrator 402 may also log information associated with responses of the plurality of agents, and any feedback from the user, in an interaction memory, from which each of the plurality of agents may learn and update its algorithm in providing an answer.

Figure 4F:
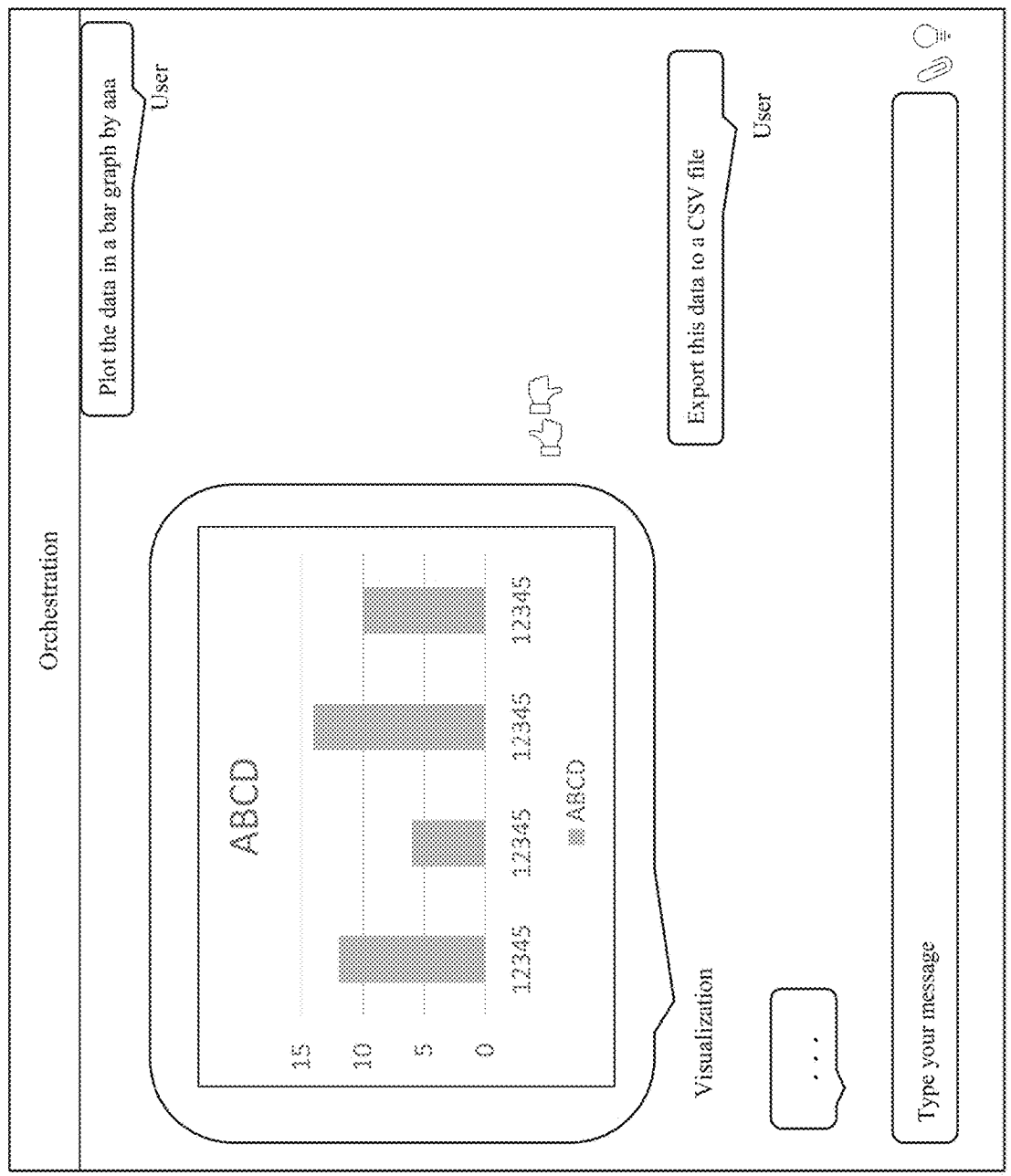

Continuing to FIG. 4F, a user may input another query 426, e.g., asking to export the data. The orchestrator 402 sends this query to the plurality of agents 406, 408, 410, 412 and/or 414, to provide a response to this query. For answering this example query, the data export agent 412 may provide a response with the highest score, and the orchestrator 402 may select that agent to provide a response. The orchestrator 402 may also log information associated with responses of the plurality of agents in an interaction memory, from which each of the plurality of agents may learn and update its algorithm in providing an answer.

In an embodiment, agents that orchestrator handles or communicates with can change, for example, one or more agents can be added, one or more agents can be deleted. In an embodiment, each of the agents can learn based on user feedback of its response and responses from other agents.

Figure 5:
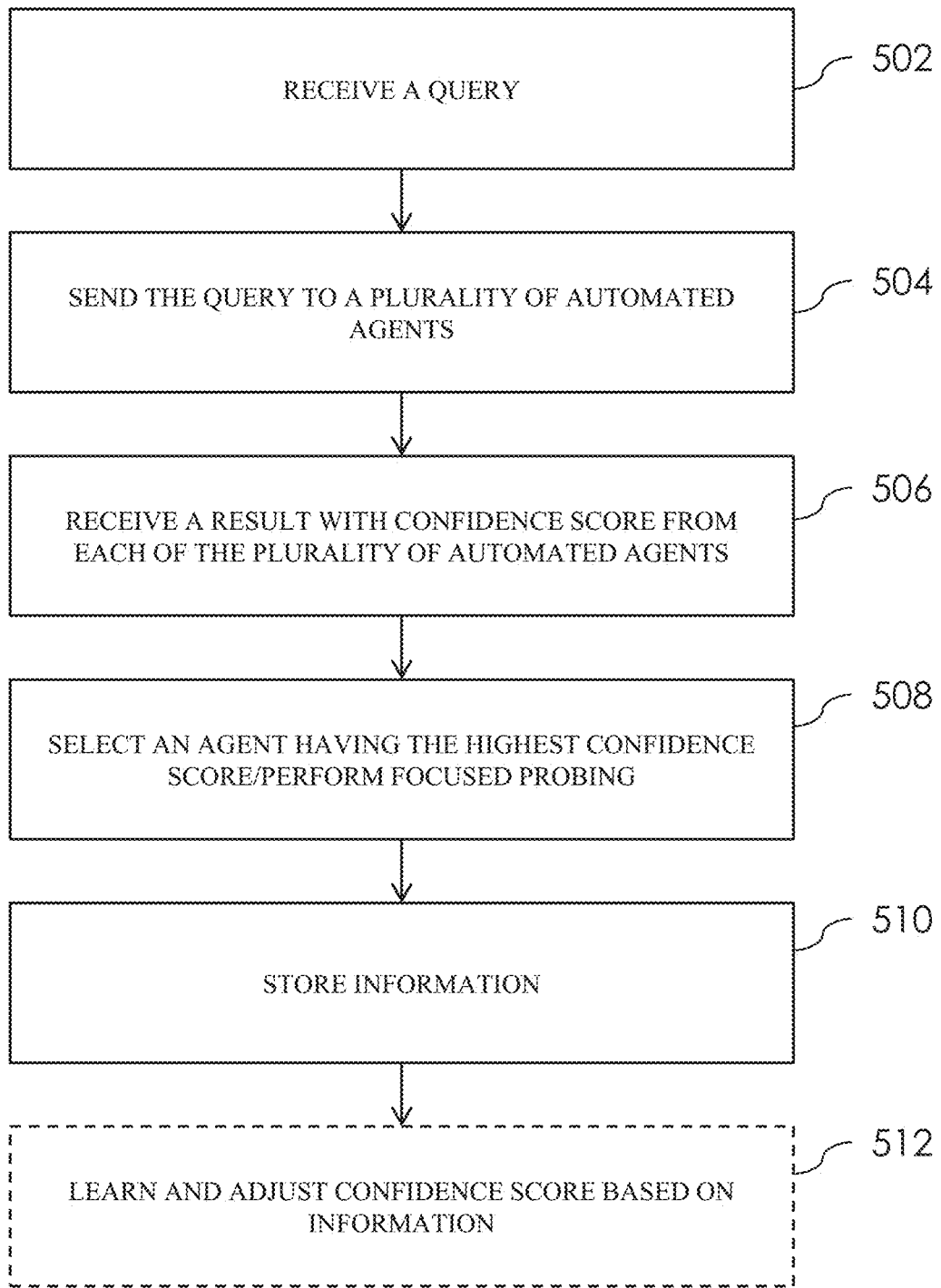
FIG. 5 is a flow diagram illustrating a method of managing multi-agents in an embodiment.

FIG. 5 is a flow diagram illustrating a method of managing agents in a multi-agent environment in an embodiment. The method can be implemented on or performed by one or more computer processors, for example, including one or more hardware processors operatively coupled with one or more storage or memory devices. The method in an embodiment enables an agent to dynamically compute adaptive confidence score through active learning and/or intelligently interacting with an orchestrator or mediator to learn about other agents in the environment. In an embodiment, the agents calibrate their output confidence based on the direct or indirect feedback from the orchestrator and thus adapting to the multi-agent environment.

At 502, the method can include receiving, for example, by a computer processor (e.g., a processor implementing a bot service such as chatbot or voicebot), a conversation from a user. The conversation, for example, is an utterance or query, for instance, that the user types in or speaks or utters as speech, for example, in natural language.

At 504, the computer processor may send or broadcast the query to a plurality of automated agents to process the query. The plurality of agents, themselves can be automated bots that can perform tasks. For example, the bots can be implemented as or include machine learning models such as artificial neural networks or other machine learning models trained to perform a task. Each of the agents or bots receiving the query can process the query and may provide a result or response to the query. Each of the agents or bots also provide a confidence score associated with the response it provides. An example of an agent or bot can be a chatbot capable of carrying on a conversation with the user.

At 506, the computer processor may receive results and associated confidence scores from the plurality of automated agents, e.g., receive a result with a confidence score from each of the plurality of agents, to which it sent the query at 502. In an embodiment, the computer processor may select an automated agent that provided the result with the highest confidence score out of the plurality of automated agents, to carry on the conversation with the user, for example to answer the user's query. For example, in an embodiment, the conversation can be transferred to the selected automated agent to handle the query. In another embodiment, the computer processor provides the result returned by the selected automated agent to the user.

At 508, in an embodiment, the computer processor may probe at least some of the results and associated confidence scores, based at least on a reason given for a result having the highest associated confidence score among the received results and associated confidence scores, to select an automated agent from the plurality of automated agents for answering the query. For example, if the highest confidence score is not 100 percent, e.g., the automated agent provided an indication or reason for its confidence score being less than 100 percent, the computer processor may further perform a focused probing to determine whether any other agents could have provided a better result. If, for example, the automated agent's reason is that it did not understand an aspect of the query, which the computer processor determines to be an important aspect in responding to the query (e.g., affects the accuracy of the provided result), the computer processor may look for another agent that can better handle that aspect. For instance, as discussed above, if a query included a request to "plot" certain data, and the automated agent returning the highest confidence score (albeit not 100 percent) indicated that it did not understand the word "plot", the computer processor may look to another agent that can better perform a task involving plotting, for example, a visualization agent. In this scenario, the computer processor also may send a feedback to the automated agent returning the highest confidence score to adjust its confidence score for this type of a query, for example, a query that includes a "plot" request, informing it that there is another agent that can better perform this type of task. In response, the automated agent may learn from this feedback and adjust its score to a lower score. So for example, the next time such a query is issued, this automated agent may return a lower confidence score than for example, another agent (e.g., visualization agent) that can better handle the request for plotting data, allowing the computer processor to be able to select that other agent (e.g., visualization agent).

For example, probing can include determining that an agent returning the result with the highest associated confidence score identified the reason and determining that the reason indicates that the agent did not understand an aspect of the query affecting accuracy of the result with the highest associated confidence score. The computer processor then may select from the plurality of agents another agent understanding the aspect of the query, as the selected automated agent for answering the query.

At 510, the computer processor may store in memory (e.g., referred to above as an interaction memory) the results and associated confidence scores returned by the plurality of agents, and also which agent it selected to provide a result or response to the query. The computer processor may also store any feedback from the user regarding the provided result or response to the query. Each of the plurality of agents may employ a learning mechanism to learn from the information stored in the interaction memory. For example, as shown at 512, an agent may update its scoring mechanism based on the information or feedback provided in the interaction memory. For example, at least one of the plurality of automated agents learns from the stored information to update a confidence score in answering the query. Scoring mechanism can include retraining its learning algorithm or learning model, updating its parameters, and/or others.

In an embodiment, at least one of the plurality of automated agents learns from the stored information to update its confidence score in answering the query or similar future query by normalizing or standardizing the confidence score over the associated confidence scores returned by the plurality of the automated agents. For example, mean, variance, maximum and minimum statistical measures can be utilized to normalize a confidence score.

In an embodiment, at least one of the plurality of automated agents learns from the stored information to update its confidence score by learning n-gram bag of words, which if contained in future one or more queries, the agent should not handle. For example, if those words are contained in future one or more queries, the agent would know that it is not best suited to handle those queries, and therefore, may lower its confidence score in answering such queries.

In an embodiment, at least one of the plurality of automated agents learns from the stored information to update its confidence score in answering the query by learning a context free grammar representing phrases, which if contained in future one or more queries, the agent would recognized not to handle such queries. For example, if those phrases are contained in future one or more queries, the agent would know that it is not best suited to handle those queries, and therefore, may lower its confidence score in answering such queries.

In an embodiment, at least one of the plurality of automated agents learns from the stored information to update its confidence score in answering the query by training a classifier such as a neural network or another machine learning model to classify words, which if contained in future one or more queries, the agent should not handle those queries.

In an embodiment, at least one of the plurality of automated agents learns from the stored information to update its confidence score in answering the query by computing a reward-based dynamic scoring based on parameters. The parameters may include at least the associated confidence scores of the plurality of automated agents, attributes of the query and whether said at least one of the plurality of automated agents is selected or not selected for answering the query. The reward-based dynamic scoring includes hyperparameters associated with the associated confidences scores, the attributes of the query, and a weight associated with whether said at least one of the plurality of automated agents is selected or not selected for answering the query. The hyperparameters can be tuned over time based on training examples.

Figure 6:
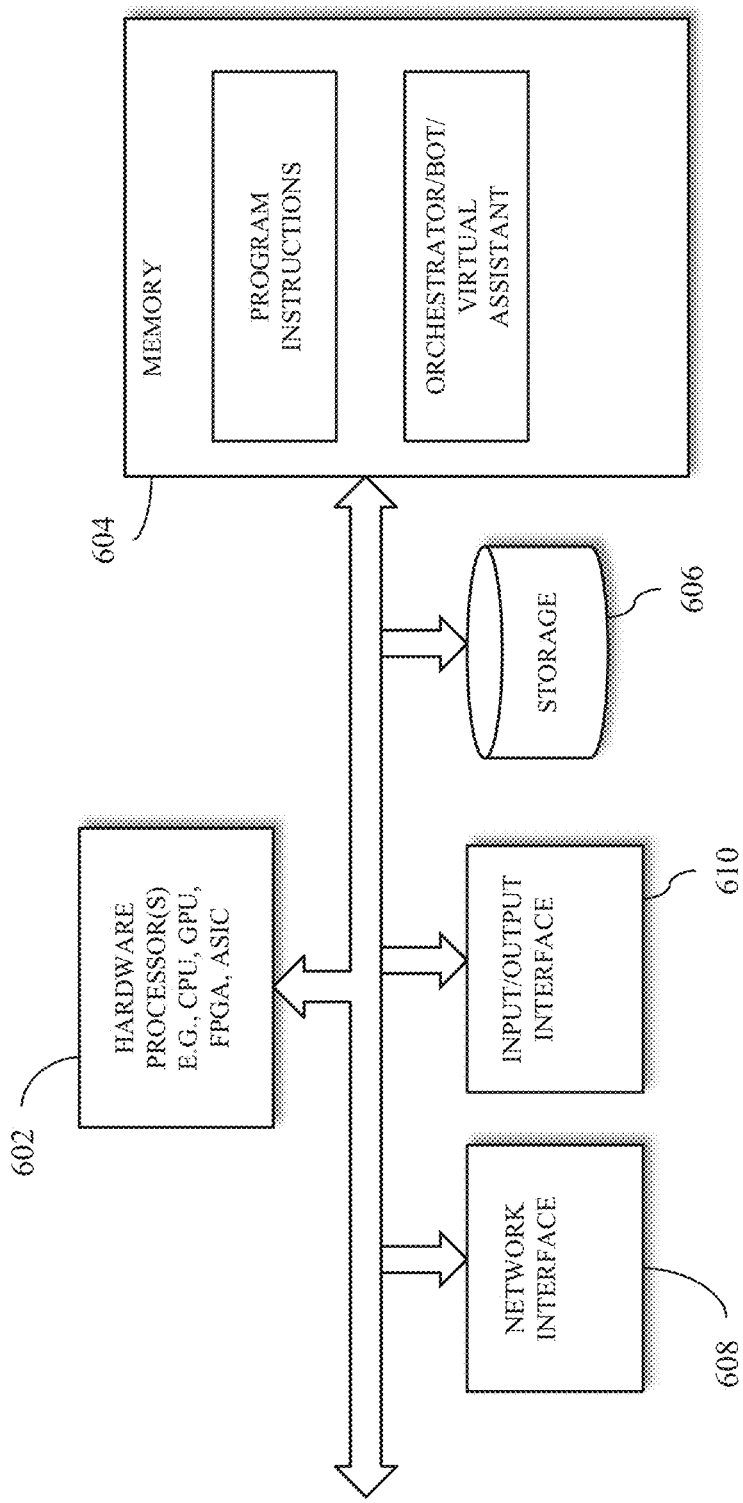
FIG. 6 is a diagram showing components of a system in one embodiment that manages multi-agents.

FIG. 6 is a diagram showing components of a system in one embodiment that manages multi-agents. One or more hardware processors 602 such as a central processing unit (CPU), a graphic process unit (GPU), and/or a Field Programmable Gate Array (FPGA), an application specific integrated circuit (ASIC), and/or another processor, may be coupled with a memory device 604, and generate a prediction model and recommend communication opportunities. A memory device 604 may include random access memory (RAM), read-only memory (ROM) or another memory device, and may store data and/or processor instructions for implementing various functionalities associated with the methods and/or systems described herein. One or more processors 602 may execute computer instructions stored in memory 604 or received from another computer device or medium. A memory device 604 may, for example, store instructions and/or data for functioning of one or more hardware processors 602, and may include an operating system and other program of instructions and/or data. At least one hardware processor 602 may receive a query from a user, for example, in a chat session with one or more hardware processors 602. At least one hardware processor 602 may send the query to a plurality of automated agents to process the query. At least one hardware processor 602 may receive results and associated confidence scores from the plurality of automated agents. At least one hardware processor 602 may probe at least some of the results and associated confidence scores, based at least on a reason given for a result having the highest associated confidence score among the received results and associated confidence scores, to select an automated agent from the plurality of automated agents for answering the query. At least one hardware processor 602 may store information including at least the results and associated confidence scores and a selected automated agent for answering the query, where at least one of the plurality of automated agents learns from the stored information to update its confidence score in answering the query. In an embodiment, results and associated confidence scored may be stored on a storage device 606 and/or communicated to one or more of the plurality of automated agents. Communication with one or more of the plurality of automated agents can be performed via a network interface 608, for example, if one or more of the plurality of automated agents are located on a remote system. If one or more of the plurality of automated agents are located locally with the one or more hardware processors 602, the communications can be performed locally. One or more hardware processors 602 may be coupled with interface devices such as a network interface 608 for communicating with remote systems, for example, via a network, and an input/output interface 610 for communicating with input and/or output devices such as a keyboard, mouse, display, and/or others.

In an embodiment in a natural language utterance based multi-agent system (or framework), each automated agent is capable of dynamically changing its output confidence and adapt to its multi-agent environment. The system allows for each agent calibrating an agent's confidence score based on feedback from a central orchestrator, e.g., via focused probing which helps multi-agent environment to become more accurate, thus improving the multi-agent environment. Agents can produce a dynamic output score by actively learning from historical interaction memory, e.g., via analyzing utterances for frequent n-grams and/or a CFG representing non-NLQ head phrases. Interaction memory or like can be utilized to actively learn to dynamically update confidence of each agent.

Figure 7:
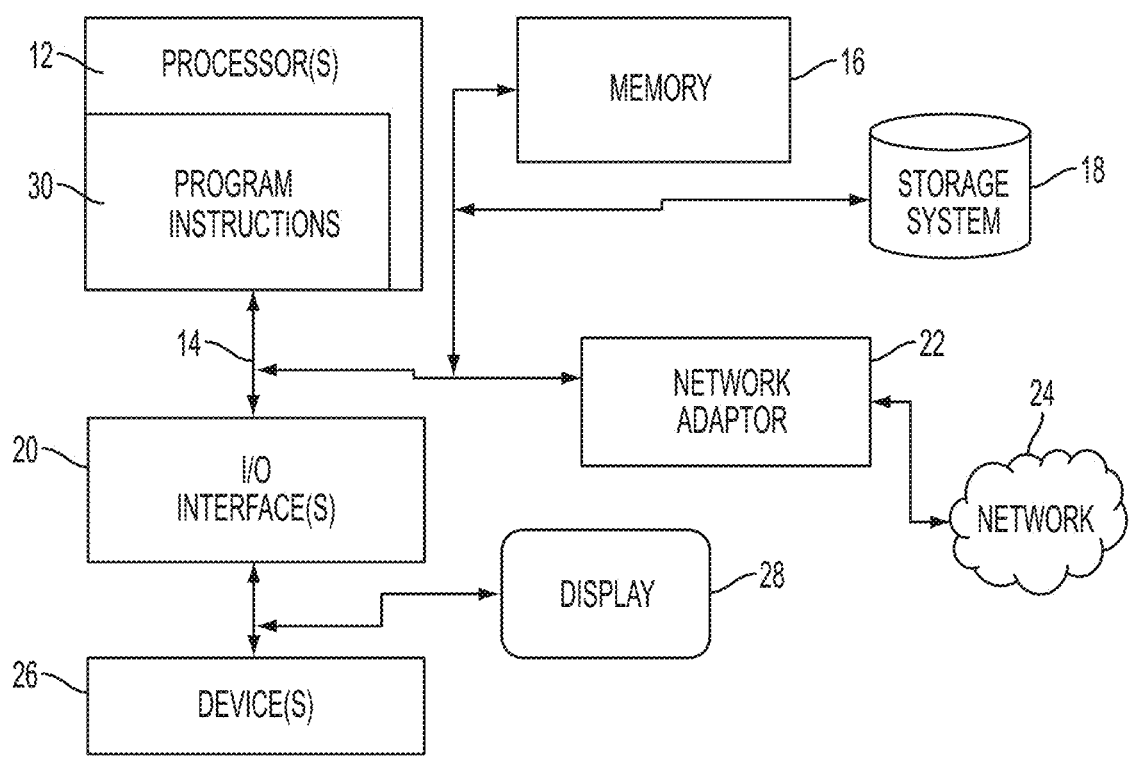
FIG. 7 illustrates a schematic of an example computer or processing system that may implement a system according to one embodiment.

FIG. 7 illustrates a schematic of an example computer or processing system that may implement a system in one embodiment. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 7 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being run by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
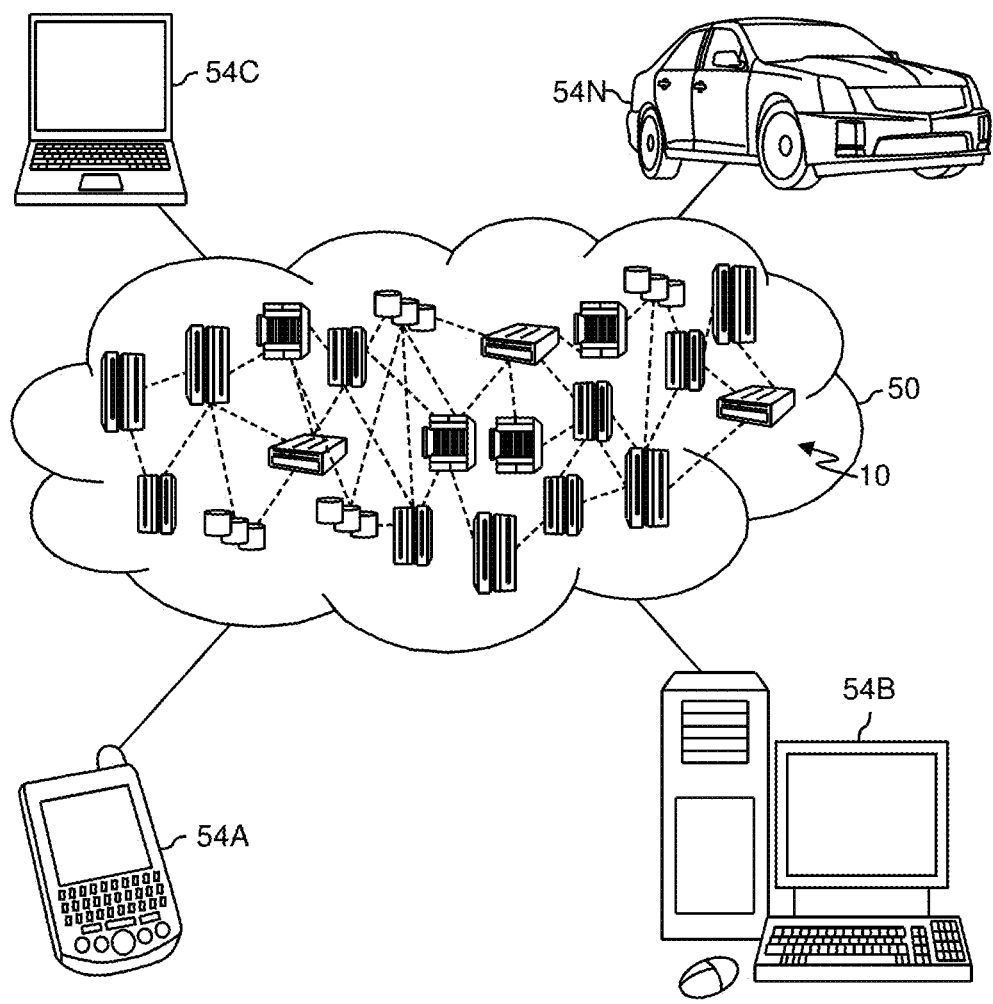
FIG. 8 illustrates a cloud computing environment in one embodiment.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
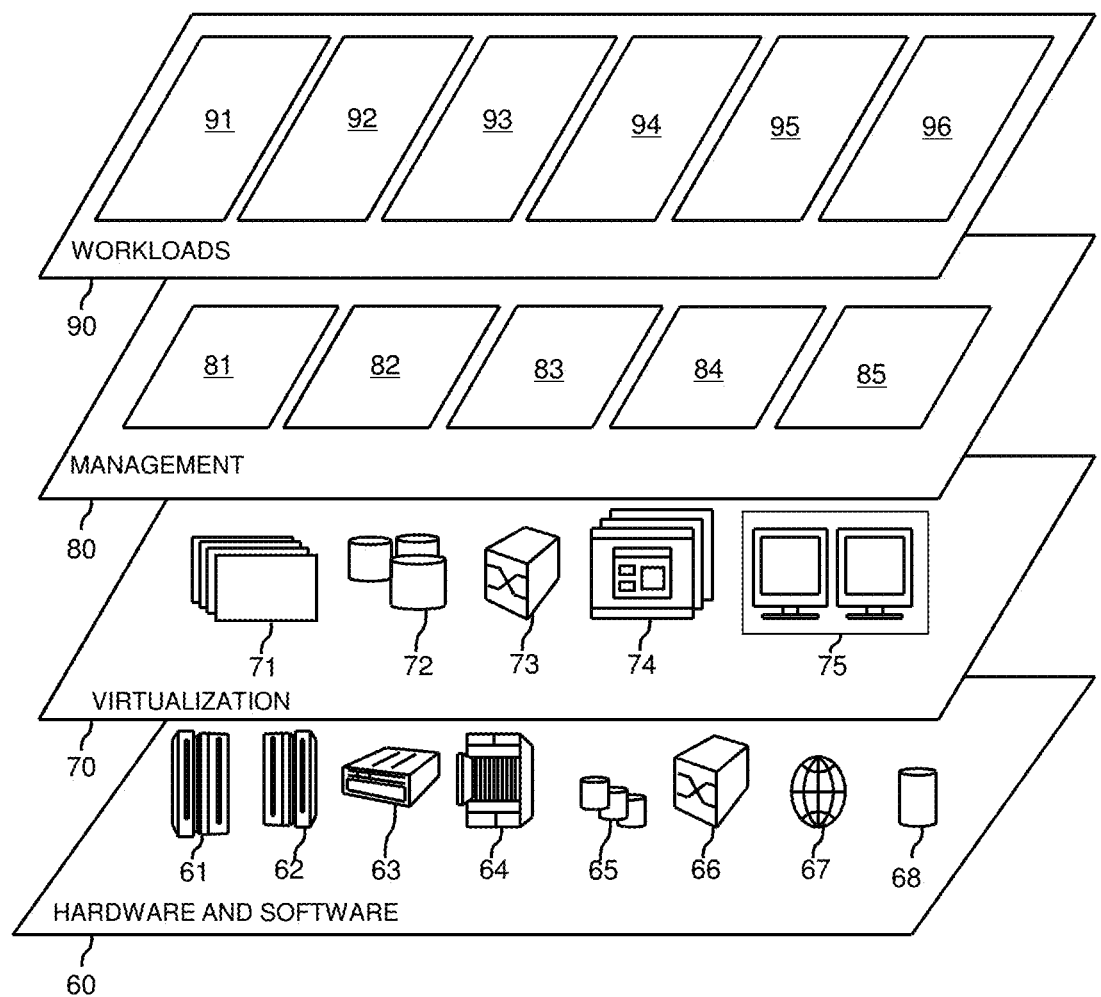
FIG. 9 illustrates a set of functional abstraction layers provided by cloud computing environment in one embodiment of the present disclosure.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and multi-agent system processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, run concurrently, substantially concurrently, in a partially or wholly temporally overlapping manner, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "or" is an inclusive operator and can mean "and/or", unless the context explicitly or clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof. As used herein, the phrase "in an embodiment" does not necessarily refer to the same embodiment, although it may. As used herein, the phrase "in one embodiment" does not necessarily refer to the same embodiment, although it may. As used herein, the phrase "in another embodiment" does not necessarily refer to a different embodiment, although it may. Further, embodiments and/or components of embodiments can be freely combined with each other unless they are mutually exclusive.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:
receiving a query from a user;
sending the query to a plurality of automated agents to process the query;
receiving results and associated confidence scores from the plurality of automated agents;
probing at least some of the results and associated confidence scores, based at least on a reason given for a result having the highest associated confidence score among the received results and associated confidence scores, to select an automated agent from the plurality of automated agents for answering the query;
storing information including at least the results and associated confidence scores and a selected automated agent for answering the query, wherein at least one of the plurality of automated agents learns from the stored information to update a confidence score of said at least one of the plurality of automated agents in answering the query at least based on intent classification of an utterance aspect of the query by another of the plurality of automated agents other than said at least one of the plurality of automated agents answering the query; and
responding to the query by outputting a result of a selected automated agent selected among the plurality of automated agents.

2. The method of claim 1, wherein said probing includes determining that an agent returning the result with the highest associated confidence score identified the reason and determining that the reason indicates that the agent has an uninterpreted aspect of the query affecting accuracy of the result with the highest associated confidence score.

3. The method of claim 2, further including selecting from the plurality of automated agents another agent understanding the aspect of the query, as the selected automated agent for answering the query.

4. The method of claim 1, wherein said at least one of the plurality of automated agents learns from the stored information to update a confidence score of said at least one of the plurality of automated agents in answering the query by:
normalizing the confidence score over the associated confidence scores returned by the plurality of the automated agents.

5. The method of claim 1, wherein said at least one of the plurality of automated agents learns from the stored information to update a confidence score of said at least one of the plurality of automated agents in answering the query by:
learning n-gram bag of words, which if contained in future one or more queries, said at least one of the plurality of automated agents is not to handle.

6. The method of claim 1, wherein said at least one of the plurality of automated agents learns from the stored information to update a confidence score of said at least one of the plurality of automated agents in answering the query by:
learning a context free grammar representing phrases, which if contained in future one or more queries, said at least one of the plurality of automated agents is not to handle.

7. The method of claim 1, wherein said at least one of the plurality of automated agents learns from the stored information to update a confidence score of said at least one of the plurality of automated agents in answering the query by:
training a classifier to classify words, which if contained in future one or more queries, said at least one of the plurality of automated agents is not to handle.

8. The method of claim 1, wherein said at least one of the plurality of automated agents learns from the stored information to update a confidence score of said at least one of the plurality of automated agents in answering the query by:
computing a reward-based dynamic scoring based on parameters including at least the associated confidence scores of the plurality of automated agents, attributes of the query and whether said at least one of the plurality of automated agents is selected or not selected for answering the query, the reward-based dynamic scoring including hyperparameters associated with the associated confidences scores, the attributes of the query, and a weight associated with whether said at least one of the plurality of automated agents is selected or not selected for answering the query, the hyperparameters being tuned over time based on training examples.

9. The method of claim 1, wherein said plurality of automated agents includes at least a chatbot capable of carrying on a conversation with the user.

10. A system comprising:
a processor; and
a memory device coupled with the processor;
the processor configured to at least:
receive a query from a user;
send the query to a plurality of automated agents to process the query;
receive results and associated confidence scores from the plurality of automated agents;
probe at least some of the results and associated confidence scores, based at least on a reason given for a result having the highest associated confidence score among the received results and associated confidence scores, to select an automated agent from the plurality of automated agents for answering the query;
store information including at least the results and associated confidence scores and a selected automated agent for answering the query, wherein at least one of the plurality of automated agents learns from the stored information to update a confidence score of said at least one of the plurality of automated agents in answering the query at least based on intent classification of an utterance aspect of the query by another of the plurality of automated agents other than said at least one of the plurality of automated agents answering the query; and
respond to the query by outputting a result of a selected automated agent selected among the plurality of automated agents.

11. The system of claim 10, wherein the processor is configured to probe by determining that an agent returning the result with the highest associated confidence score identified the reason and determining that the reason indicates that the agent has an uninterpreted aspect of the query affecting accuracy of the result with the highest associated confidence score.

12. The system of claim 11, wherein the processor is further configured to select from the plurality of automated agents another agent understanding the aspect of the query, as the selected automated agent for answering the query.

13. The system of claim 10, wherein said at least one of the plurality of automated agents learns from the stored information to update a confidence score of said at least one of the plurality of automated agents in answering the query by:
    normalizing the confidence score over the associated confidence scores returned by the plurality of the automated agents.

14. The system of claim 10, wherein said at least one of the plurality of automated agents learns from the stored information to update a confidence score of said at least one of the plurality of automated agents in answering the query by learning n-gram bag of words, which if contained in future one or more queries, said at least one of the plurality of automated agents is not to handle.

15. The system of claim 10, wherein said at least one of the plurality of automated agents learns from the stored information to update a confidence score of said at least one of the plurality of automated agents in answering the query by learning a context free grammar representing phrases, which if contained in future one or more queries, said at least one of the plurality of automated agents is not to handle.

16. The system of claim 10, wherein said at least one of the plurality of automated agents learns from the stored information to update a confidence score of said at least one of the plurality of automated agents in answering the query by training a classifier to classify words, which if contained in future one or more queries, said at least one of the plurality of automated agents is not to handle.

17. The system of claim 10, wherein said at least one of the plurality of automated agents learns from the stored information to update a confidence score of said at least one of the plurality of automated agents in answering the query by computing a reward-based dynamic scoring based on parameters including at least the associated confidence scores of the plurality of automated agents, attributes of the query and whether said at least one of the plurality of automated agents is selected or not selected for answering the query, the reward-based dynamic scoring including hyperparameters associated with the associated confidences scores, the attributes of the query, and a weight associated with whether said at least one of the plurality of automated agents is selected or not selected for answering the query, the hyperparameters being tuned over time based on training examples.

18. The system of claim 10, wherein said plurality of automated agents includes at least a chatbot capable of carrying on a conversation with the user.

19. A computer program product comprising a computer readable storage medium having program instructions embodied therewith, the program instructions readable by a device to cause the device to:
    receive a query from a user;
    send the query to a plurality of automated agents to process the query;
    receive results and associated confidence scores from the plurality of automated agents;
    probe at least some of the results and associated confidence scores, based at least on a reason given for a result having the highest associated confidence score among the received results and associated confidence scores, to select an automated agent from the plurality of automated agents for answering the query;
    store information including at least the results and associated confidence scores and a selected automated agent for answering the query, wherein at least one of the plurality of automated agents learns from the stored information to update a confidence score of said at least one of the plurality of automated agents in answering the query at least based on intent classification of an utterance aspect of the query by another of the plurality of automated agents other than said at least one of the plurality of automated agents answering the query; and
    respond to the query by outputting a result of a selected automated agent selected among the plurality of automated agents.

20. The computer program product of claim 19, wherein the device is caused to probe by determining that an agent returning the result with the highest associated confidence score identified the reason and determining that the reason indicates that the agent has an uninterpreted aspect of the query affecting accuracy of the result with the highest associated confidence score, wherein the device is further caused to select from the plurality of automated agents another agent understanding the aspect of the query, as the selected automated agent for answering the query.

* * * * *